Dec. 26, 1961   R. L. LITTLER ETAL   3,014,788
OPTICAL MEANS AND METHOD FOR THE MEASUREMENT OF CORROSION
Filed Nov. 25, 1959
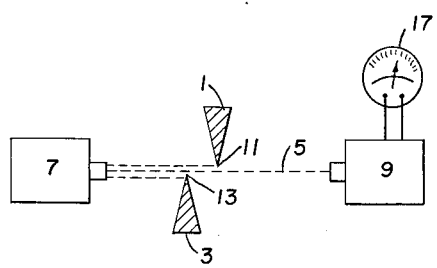
FIG. 1
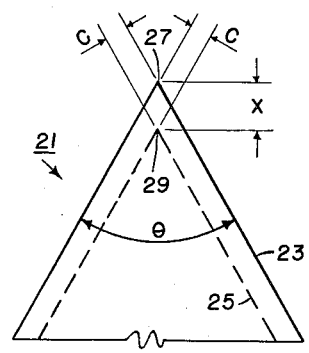
FIG. 2
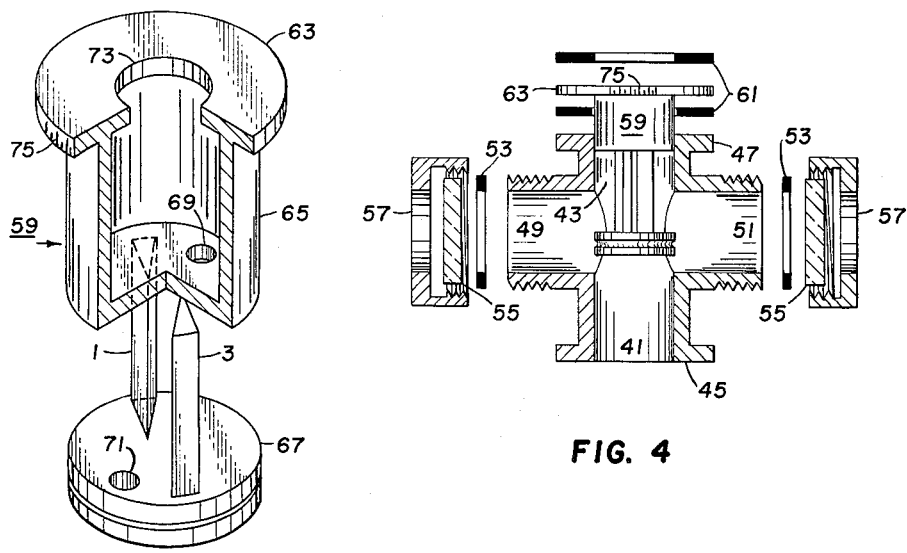
FIG. 3
FIG. 4
INVENTORS
ROBERT L. LITTLER
EDWARD SCHASCHL
BY
*Edward H. Lang*
ATTORNEY United States Patent Office 3,014,788
Patented Dec. 26, 1961

3,014,788
OPTICAL MEANS AND METHOD FOR THE MEASUREMENT OF CORROSION
Robert L. Litiler and Edward Schaschl, Crystal Lake, Ill., assignors to The Pure Oil Company, Chicago, Ill., a corporation of Ohio
Filed Nov. 25, 1959, Ser. No. 855,463
10 Claims. (Cl. 23—230)

This invention is directed to a method and device for determining corrosion rates. More specifically, this invention is directed to an apparatus which includes two wedge-shaped, corrodible blocks of metal positioned in a corrosive environment under test, in combination with light-transmitting and -receiving means by which the rate at which the sharp edges of the blocks recede from each other under the influence of corrosion can be measured.

It is an object of this invention to provide a method and apparatus for accurately measuring the rate of corrosion of a metal in a corrosive environment. It is another object of this invention to provide an apparatus for determining the corrosive characteristics of a fluid in a flowing process stream.

In brief, the method of this invention comprises placing the sharp edges of two wedge-shaped, metallic blocks adjacent to each other in a corrosive environment and passing a beam of light from a constant light source between the two sharp edges. As the two blocks corrode, the edges recede from each other, and the light beam, which is collimated by the edges of the blocks, increases in width. The amount of light passing between the blocks is measured by some suitable means, such as a photoelectric cell. It is evident that the rate of increase of the current developed by the photoelectric cell is proportional to the rate of corrosion of the wedge-shaped blocks.

This invention is best described with reference to the drawings, of which:

FIGURE 1 is a schematic drawing of the essential elements of the apparatus of this invention.

FIGURE 2 is a sketch of the sharp edge of a wedge block and is useful in explaining how the rate of recession of the sharp edge of the block is related to the rate at which metal is removed by the corrosion process.

FIGURE 3 is a perspective view of an adaptation of the apparatus of this invention for insertion in a standard bull's-eye.

FIGURE 4 is a view of a standard bull's-eye into which the apparatus of FIGURE 3 has been partially inserted.

Referring to FIGURE 1, wedge-shaped blocks 1 and 3 are positioned on opposite sides of light beam 5, which passes from light source 7 to light receiver 9. Blocks 1 and 3 are fabricated from a corrodible material, and are positioned so that planes passing through the sharp edges of these wedge blocks and thence through the centers of the wedge blocks are parallel. The blocks are preferably laterally spaced from each other along light beams. Sharp edges 11 and 13 of blocks 1 and 3, respectively, are set parallel with each other. Thus, blocks 1 and 3 block the passage of light, except for the narrow, collimated beam 5 which passes between the sharp edges 11 and 13 of the blocks. As metal corrodes from the surfaces of blocks 1 and 3, edges 11 and 13 recede from the center line of beam 5, permitting a wider beam and more light to reach receiver 9. This receiver may be a photoelectric cell or other light receiver capable of converting light energy into electrical energy. The electrical output from receiver 9 is measured on instrument 17, which may be an ammeter, and preferably is calibrated to indicate the metal loss on the flat faces of the wedge blocks 1 and 3 directly in fractions of an inch. Light source 7 and receiver 9 are maintained in position by a suitable support, and preferably are in the same elevational plane, a plane to which edges 11 and 13 are parallel.

It is evident that corrosion of the wedge-shaped blocks allows an incremental increase in the amount of light transmitted therebetween. This incremental increase is proportional to the corrosion taking place over a period of time, and is correlatable with the corrosion rate. After some corrosion has taken place, the amount of light transmitted may become too large to be recorded or indicated, in which case the light source and receiver may be rotated with respect to the wedge blocks to decrease the width of the light beam passing between the edges of the wedge blocks. Alternatively, the wedge blocks themselves may be rotated in a clockwise direction from the positions shown in FIGURE 1 to decrease the width of the light beam. As another alternative, one or more of the wedge blocks may be made movable to permit adjustment of the width of the light beam. Thus, it is possible to determine the rate of corrosion of metal from the blocks by determining the increase in current in the photoelectric circuit, or by measuring the distance through which one or both blocks must be moved or rotated to re-establish the initial current flowing in the photoelectric cell circuit.

The measurement of the corrosion rate can be amplified by changing the angle of the wedge blocks. Referring to FIGURE 2, wedge block 21 is considered to recede from initial surface 23 to surface 25 as corrosion takes place along surface 23 of the block. Thus, the thickness of metal loss is represented by the distance C. As this metal loss is incurred, point 27 of the wedge block recedes to point 29 through a distance X. If the angle of the wedge is $\theta$, it is evident that $$\frac{C}{X} = \sin\left(\frac{\theta}{2}\right)$$

and that the amplification ratio $$\frac{X}{C} = \frac{1}{\sin\left(\frac{\theta}{2}\right)}$$

Thus, the sharper the angle of the wedge is made, the greater will be the amplification.

A more detailed embodiment of this invention, depicting a suitable method for mounting the wedge blocks in a flowing fluid stream, is illustrated in FIGURE 3. The assembly shown in FIGURE 3 may be mounted in a standard bull's-eye fitting for installation in the main stream of a fluid under study, or in a by-pass line provided for the purpose. FIGURE 4 shows a standard bull's-eye fitting into which the apparatus of this invention has been partially inserted. The bull's-eye shown in FIGURE 4 may be connected in a fluid by-pass line so that fluid enters the bull's-eye through opening 41 and leaves through opening 43. The bull's-eye is equipped with flanges 45 and 47, which are used to connect the bull's-eye between the standard fittings in a flow line or by-pass line. Cross channels 49 and 51 are equipped with sealing gaskets 53, lenses 55, and lens-retaining covers 57. Corrosion-detecting apparatus 59 is insertable within the bull's-eye, and gaskets 61 are placed on both sides of flange 63 of the corrosion-detecting apparatus to provide a fluid-tight seal when the bull's-eye is installed in a flow line.

The corrosion-detection device depicted in FIGURE 3 comprises wedge-block support 65 which includes disc 63, wedge blocks 1 and 3, and base disc 67, which is secured to and supported by the lower ends of the wedge blocks. Wedge-block support 65 is equipped with a fluid-passage hole 69, and base ring 67 is equipped with a fluid-passage hole 71. Holes 69 and 71 are disposed on opposite sides of the space between the wedge blocks. Thus, the course of fluid flow is through hole 71, between the wedge blocks, thence through hole 69, and upward through wedge-block support 65 and hole 73 in disc 63. Disc 63 is preferably marked along its periphery with a plurality of graduated indicia, 75, which may be arranged to correspond to angles of 1° or a fraction thereof. Flange 47 of the bull's-eye is preferably marked with a registration line, so that the angular displacement of the corrosion-measurement assembly, with respect to the bull's-eye, may be measured and recorded.

The corrosion-measurement apparatus depicted in FIGURE 3 is inserted in the bull's-eye, and the bull's-eye is secured in place in a flow line. A light beam from a suitable source is passed through glass plate 55, through the cross-channels of the bull's-eye, and between the wedge blocks. Collimation of this light beam is obtained by rotation of disc 63 to correctly orient the wedge blocks with respect to the light beam, or by rotation of the light source and photoelectric cell while the disc 63 is held stationary. Disc 63 may be rotated to provide a collimated light beam which is sufficient to provide a suitable small current in the photoelectric cell circuit. Flow of fluid through the bull's-eye eventually results in the corrosion of the surfaces of the wedge blocks, the edges of the wedge blocks recede from the center of the light beam, and the current flow in the photoelectric cell circuit increases as corrosion progresses. After a suitable test period, the extent of corrosion may be determined by measurement of the current flowing in the photoelectric circuit. Alternatively, disc 63 may be rotated to reduce the width of the light beam to such an extent that the current flowing in the photoelectric cell circuit is equal to that initially flowing before any substantial corrosion had occurred. The angle through which disc 63 is rotated to thus reduce the current in the photoelectric cell circuit is determined by noting the position of graduations 75 with respect to the registration line on the flange 47 of the bull's-eye.

In the embodiment just described, two wedge-shaped test specimen are mounted upright in the assembly, and the test specimen is oriented in the bull's-eye fitting so the light can enter through the glass opening, pass in a straight line between the edges of the wedges, and pass out through the other window into the receiver. The light source and receiver, or photocell, may be moved until the edges of the wedges block most of the light entering the bull's-eye. The transmitted light may, for example, amount to 1 to 5 foot-candles.

The embodiments of the invention in which a exclusive property or privilege is claimed are defined as follows:

1. A method for determining the rate of corrosion of an opaque material in a corrosive environment comprising disposing a wedge-shaped, corrodible, opaque block in a translucent corrosive environment, projecting a beam of light transversely of the wedge-edge of said block to impinge thereon and be collimated thereby, measuring the magnitude of said collimated beam of light, permitting the block to remain in exposure to the corrosive environment, and again measuring the magnitude of said collimated beam of light.

2. A method for determining the rate of corrosion of a metal specimen in a corrosive environment comprising supporting two wedge-shaped blocks of said metal in substantially parallel, opposed, laterally-displaced relationship in a corrosive translucent environment, passing a beam of light through said environment and between said blocks, adjusting the position of said blocks so that the sharp-edge lines thereof are substantially parallel to each other and collimate the light beam, measuring the magnitude of said collimated light beam, permitting said blocks to remain in exposure to the corrosive environment, and again measuring the magnitude of said collimated light beam.

3. A method according to claim 2 in which the position of said blocks is adjusted after said blocks have corroded to collimate the light beam to the same magnitude as before said blocks became corroded, and the distance through which said blocks are thus moved is measured.

4. A method according to claim 2 in which the magnitude of said collimated light beam is measured by means of a photoelectric cell.

5. An apparatus for measuring the rate of corrosion of a corrodible specimen in a corrosive, translucent environment comprising a wedge-shaped block fabricated of a corrodible, opaque material, means for supporting said block in a corrosive environment, means for projecting a beam of light transversely of the wedge-edge of said block to impinge thereon and be collimated thereby, and means for measuring the magnitude of the resulting collimated beam of light.

6. An apparatus for measuring the rate of corrosion of a metallic specimen in a corrosive environment comprising two wedge-shaped blocks fabricated of said metal, adjustable means supporting said blocks in substantially parallel, opposed relationship in a corrosive environment, means for directing a light beam between said blocks, and means for measuring the magnitude of said light beam after passage between said blocks, said adjustable means being adapted to permit movement of said blocks relative to said light beam to collimate said light beam.

7. An apparatus according to claim 6 in which said means for measuring the magnitude of said light beam comprises a photoelectric cell and a current-measuring circuit.

8. An apparatus according to claim 7 in which said wedge-shaped blocks are laterally displaced from each other with respect to the axis of said light beam, and are rigidly secured to a rotatable support means.

9. An apparatus for measuring the rate of corrosion of a corrodible, metallic specimen in a corrosive environment comprising a "bull's-eye," support means insertable within said bull's-eye and rotatably secured thereto, two wedge-shaped blocks fabricated of a corrodible material extended to said support means in substantially parallel, opposed, laterally-displaced relationship, means for directing a light beam into said bull's-eye and between said wedge-shaped blocks, and means for measuring the magnitude of the light beam leaving said bull's-eye.

10. An apparatus according to claim 9 including means for measuring the angular orientation of said support means relative to said light beam.

References Cited in the file of this patent

UNITED STATES PATENTS

| | | |
|---|---|---|
| 2,510,347 | Perkins | June 6, 1950 |
| 2,812,685 | Vossberg | Nov. 12, 1957 |

OTHER REFERENCES

N.B.S. Techn. News Bull., vol. 37, #6, June 1953, pp. 88–90.